Sept. 27, 1966  S. P. NEWBERRY  3,275,787
PROCESS AND APPARATUS FOR PRODUCING PARTICLES
BY ELECTRON MELTING AND ULTRASONIC AGITATION
Filed Dec. 30, 1963  3 Sheets-Sheet 1

Inventor:
Sterling P. Newberry,
by Paul A. Frank
His Attorney.

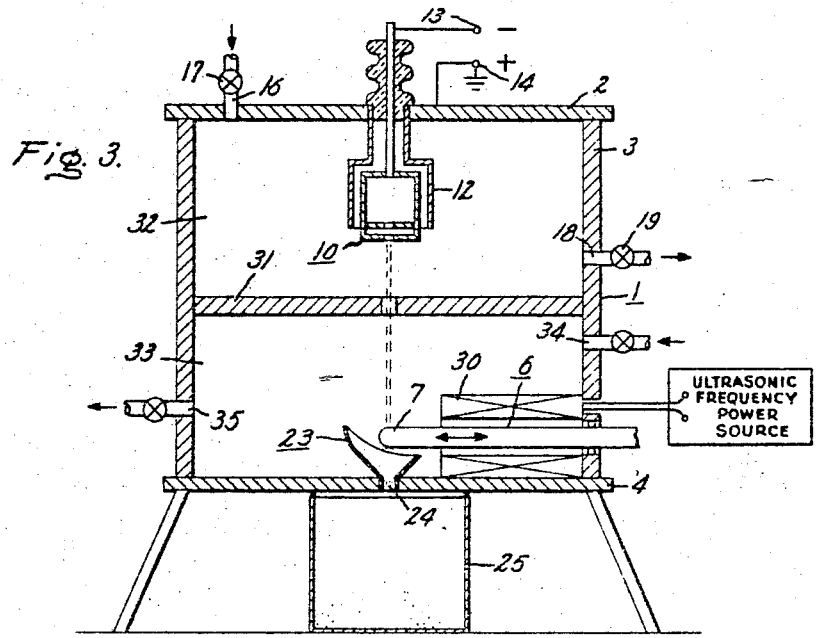
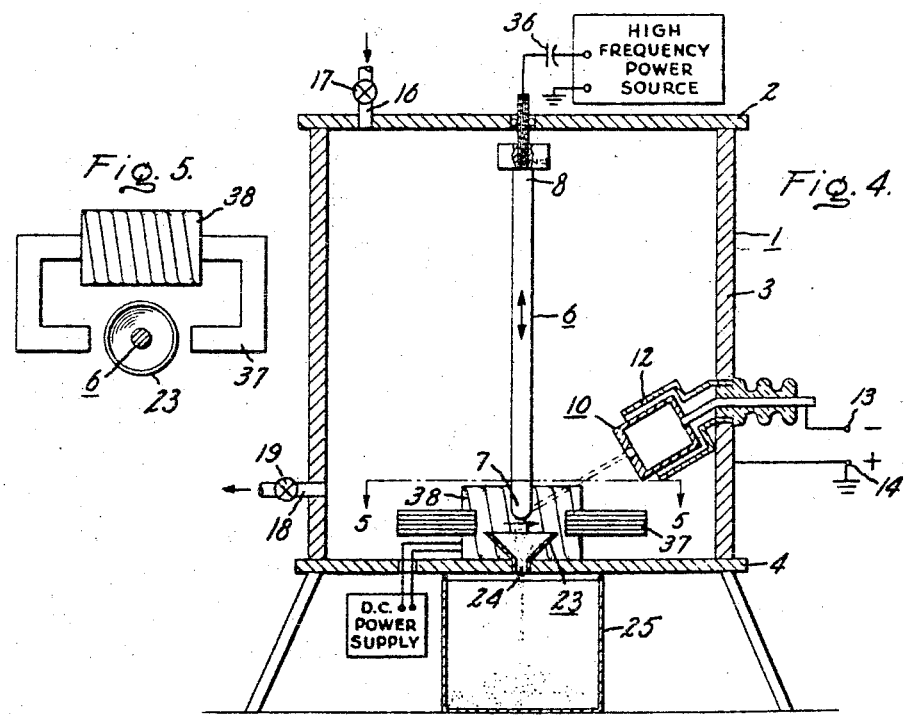

Inventor:
Sterling P. Newberry,
by Paul A. Frank
His Attorney.

3,275,787
PROCESS AND APPARATUS FOR PRODUCING PARTICLES BY ELECTRON MELTING AND ULTRASONIC AGITATION

Sterling P. Newberry, Schenectady, N.Y., assignor to General Electric Company, a corporation of New York
Filed Dec. 30, 1963, Ser. No. 334,532
20 Claims. (Cl. 219—69)

My invention relates to an improved process and apparatus for producing uniformly small particles of controlled size from a solid material characterized by the property of existing in liquid state at pressures below atmospheric, and in particular, to a process and apparatus for producing such particles by agitating the molten state of the material at ultrasonic frequency.

The inexpensive production of uniformly small particles of controlled size is an important commercial process. An application of such process is the production of metal powder, a few microns in diameter, for making powdered metal compacts. The metal compact is an efficient means for shaping metal objects from materials of high melting point, of high cost, or forming very intricate shapes. The production of powder for making powdered compacts can also be extended to other inorganic and organic compositions. In a second application, ceramic ferrite materials in small particle form are employed in the manufacture of magnets. Other applications of uniformly small particles are: resins and plastics in particulate form utilized in fluidized coating processes; resinous polymers in particulate form employed in the process of solution casting for making films. The particulate form also has importance in obtaining uniform blends of two or more plastics in solid form.

The production of liquid aerosols from a liquid surface by employing ultrasonic energy is known, however, this technique has not been generally applied to materials other than conventional liquids, that is, materials normally existing in the liquid state at room temperature and atmospheric pressure.

Therefore, one of the principal objects of my invention is to provide an improved process and apparatus for producing uniformly small particles of controlled size from a solid material capable of existing in the liquid state at pressures below atmospheric.

A very recently developed apparatus, which may be described as a plasma electron beam source, provides a very simple and inexpensive means for generating a well-collimated electron beam within a relatively low pressure gaseous medium by nonthermionic means. The intensity of such electron beam is controllable and permits the melting of not only low temperature materials but also high temperature materials such as refractory substances including, for purposes of example and not as limitation, tungsten, molybdenum, tantalum, and compounds and alloys thereof. Although, the plasma electron beam source operates within a relatively low pressure gaseous medium, such pressure is not the near-vacuum conditions employed by conventional hot cathode electron beam sources. The gaseous medium may be virtually any gas including the noncontaminating types such as helium and argon.

Another object of my invention is to provide a process and apparatus for producing uniformly small particles of controlled size, from a solid material characterized by the property of existing in liquid state at pressures below atmospheric, by electron beam melting and ultrasonic agitation of the molten state thereof.

A further object of my invention is to produce such particles in a noncontaminated form.

Briefly stated, the process in accordance with my invention includes the melting of the subject material by directing an electron beam at a selected portion thereof and agitating a thin molten surface of the material at ultrasonic frequency and a controlled amplitude of vibration whereby uniformly small spherical particles of controlled size are emitted from the molten material. The amplitude of the ultrasonic vibrations may be in the order of one or a few diameters of the particles to be formed and the particle size is controlled by controlling the amplitude and frequency of ultrasonic vibration, that is, the acceleration of the vibrating member. The particle size is also controlled by controlling the temperature of the molten state, that is, by controlling the intensity of the electron beam. Uniformly small particles having a spherical shape of size in the order of 10–100 microns diameter are obtained by this process. The spherical particles may be further processed by impacting them by a suitable technique. The impaction of the particles while in plastic state deforms them into nonspherical shape. Impaction while in molten state divides the particles into uniformly smaller spherical particles. The small particles may be conveniently collected upon their emission from the molten surface. The molten material may be agitated while forming a molten surface on the subject body of material by ultrasonically vibrating such body or, alternatively, the molten material may be detached from the main body of material and deposited in wetting contact on a separate ultrasonically vibrating surface.

The apparatus for practicing the subject process comprises a housing adapted to contain a desired low pressure gaseous atmosphere therein. An electron beam source, preferably of the plasma type including a hollow cathode operated in a nonthermionic mode, is contained within the housing and oriented so as to be directed at a particular portion of the body of solid material being processed. A means for inducing ultrasonic energy in the molten state of the subject material may comprise a conventional ultrasonic transducer for obtaining mechanical vibration at ultrasonic frequency. The property of certain materials being magnetostrictive may also be employed to obtain the ultrasonic agitation. Finally, electrically conductive materials can vibrate ultrasonically under the effects of a high frequency electrical current being induced into the solid material in the presence of a strong direct current magnetic field.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings wherein like parts in each of the several figures are identified by the same character reference and wherein:

FIGURE 3 is a third embodiment of my apparatus illustrating an arrangement for utilizing the magnetostrictive property of the material being processed to obtain ultrasonic agitation thereof;

FIGURE 4 is a fourth embodiment of my apparatus illustrating an arrangement for producing ultrasonic agitation by inducing a high frequency electrical current into the material being processed while subjecting it to a strong direct current magnetic field;

FIGURE 5 is a top plan view of the direct current magnetic field generating means of FIGURE 4 taken substantially on the line 5—5 of FIGURE 4;

My invention employs an ultrasonic agitation method for the production of small particles or fine solid powders on a commercial scale directly from the molten state of the material to be processed. The process is uniquely adapted for producing the particles from low and high melting point materials by employing an electron beam source for melting the material, and in particular, utilizing a recently developed nonthermionic hollow cathode as a plasma electron beam source.

Figure 1:
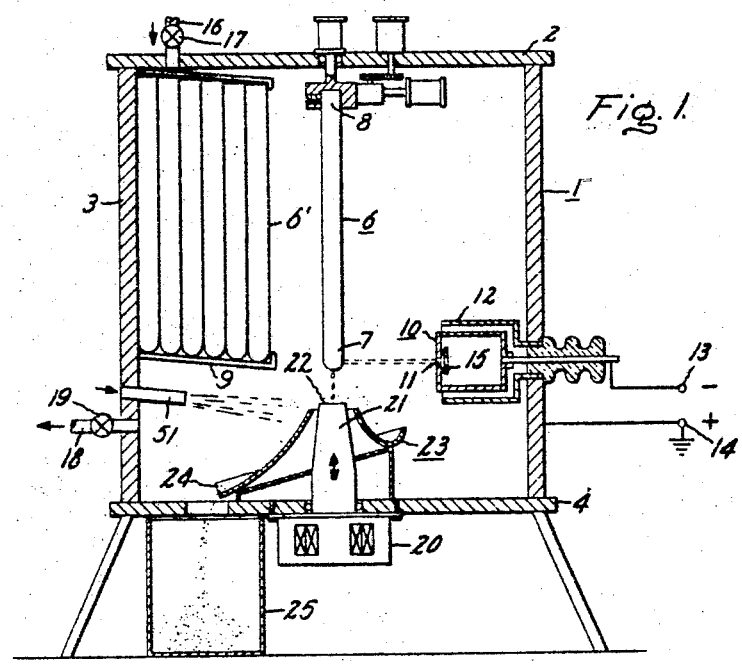
FIGURE 1 is an elevation view, partly in section, illustrating a first and preferred embodiment of an electron beam-ultrasonic transducer apparatus constructed in accordance with my invention.
Figure 2:
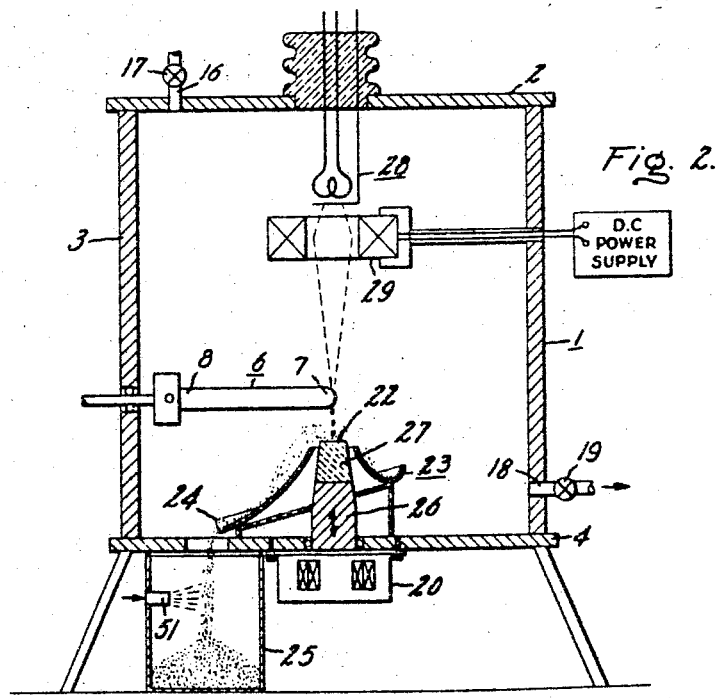
FIGURE 2 is a second embodiment of my apparatus having a modified form of the electron beam source in FIGURE 1.

In FIGURE 1 there is shown a preferred embodiment of the apparatus in accordance with my invention which is especially suited for the production of uniformly small particles from materials having the highest melting point temperatures such as tungsten, molybdenum, tantalum, and alloys and compounds thereof. Lower melting point temperature materials such as nickel, aluminum, resinous polymers, and other organic and inorganic compositions having a liquid state at pressures below atmospheric may also be processed into small solid particle form with the apparatus illustrated in FIGURE 1 since the electron beam is controllable over a wide range of beam intensity. The apparatus in FIGURE 1 includes a housing designated as a whole by numeral 1, preferably of cylindrical shape, although other forms may also be employed. Housing 1 comprises a top end plate 2, hollow cylindrical side wall 3, and bottom end plate 4 joined by well-known methods. End plates 2 and 4 are constructed of an electrically conductive material, such as metal, and wall 3 may also be constructed of such material or, alternatively, may be made of a nonporous, transparent, heat-resistant material to permit visual observation of the process taking place within housing 1. The solid material 6 to be processed is preferably a relatively long body such as a cylindrical rod for example. The body of solid material 6, although shown suspended in a vertical position in FIGURE 1, may be disposed in a horizontal plane as illustrated in FIGURE 2 or at any angle therebetween. Nonsupported first end 7 of the body of material 6 is preferably tilted downward with relation to the supported second end 8 thereof or at the same height as indicated in FIGURE 2. The unsupported end 7 is the portion of material 6 irradiated and melted by the electron beam and in certain applications may be disposed higher than the supported second end 8. The body of material 6 may be supported at end 8 in any suitable manner. For commercial scale production, a plurality of the bodies of material 6 are stored within the housing in a convenient manner such as on a storage rack 9 and any well-known mechanism may be employed to support end 8 of the material, move the body downward while being consumed, convey the expended portion of body 6 to a position for disposal, and to transfer the next body 6' from rack 9 to the processing position. Suitable means (not shown) are provided within housing 1 for introducing rods 6 therein and removing the expended rods and desired powdered end product therefrom.

The electron beam source employed for melting end 7 of the body of material consists of a hollow enclosed cathode structure 10 preferably in the form of a cylinder although other shapes may be employed. An electron beam is emitted from a single aperture 11 in the center of an end wall of cathode 10 by nonthermionic means in a manner to be briefly described hereinafter and described in detail in a copending United States patent application of Kenneth L. Boring, Serial No. 289,357, filed June 20, 1963, entitled "Nonthermionic Electron Beam Apparatus" and assigned to the assignee of the present invention. Hollow cathode 10 is constructed from an electrically conductive material which has a relatively high melting point, such as a sheet of molybdenum. An electrically conductive shield 12 surrounds cathode 10 in concentric relationship and is electrically insulated therefrom and maintained at the potential of the anode (housing 1) which is grounded in most applications. Shield 12 is a separate structure, as illustrated, or may form an integral portion of wall 3, being in the form of a cylindrical recess therein as disclosed in the above cited copending patent application. The output of a direct current power supply providing a controlled output voltage is connected to terminals 13 and 14. The negative polarity of the output voltage is connected to terminal 13 and the positive polarity to grounded terminal 14. The output voltage is adjustable from zero to approximately 30 kilovolts, and for some applications may be as high as 200 kilovolts. The power supply rating is dependent on the particular application and may be in the order of 30 kilowatts.

Figure 7:
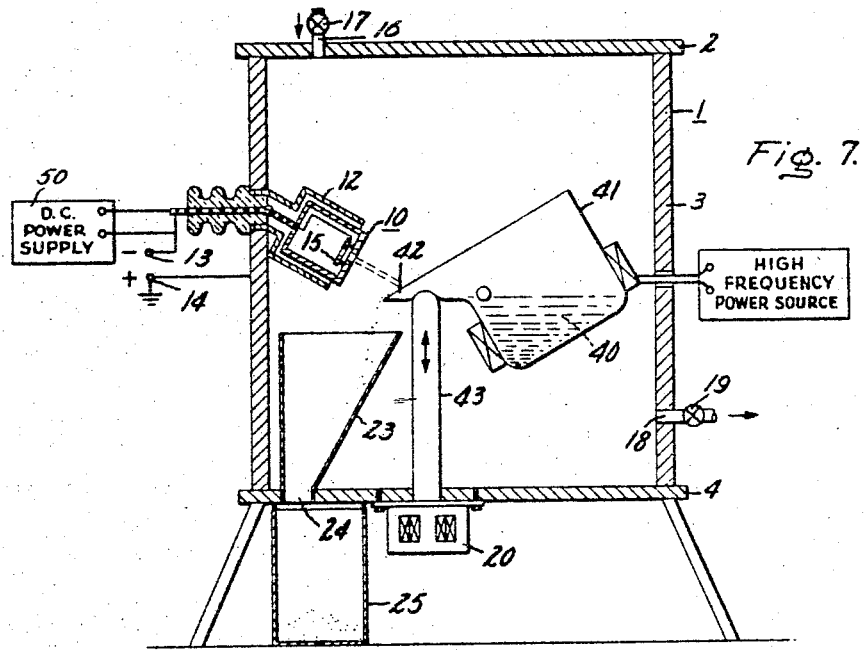
FIGURE 7 is a sixth embodiment of my apparatus and a modification of the apparatus illustrated in FIGURE 6 wherein the ultrasonic vibration is applied directly to the container.
Figure 6:
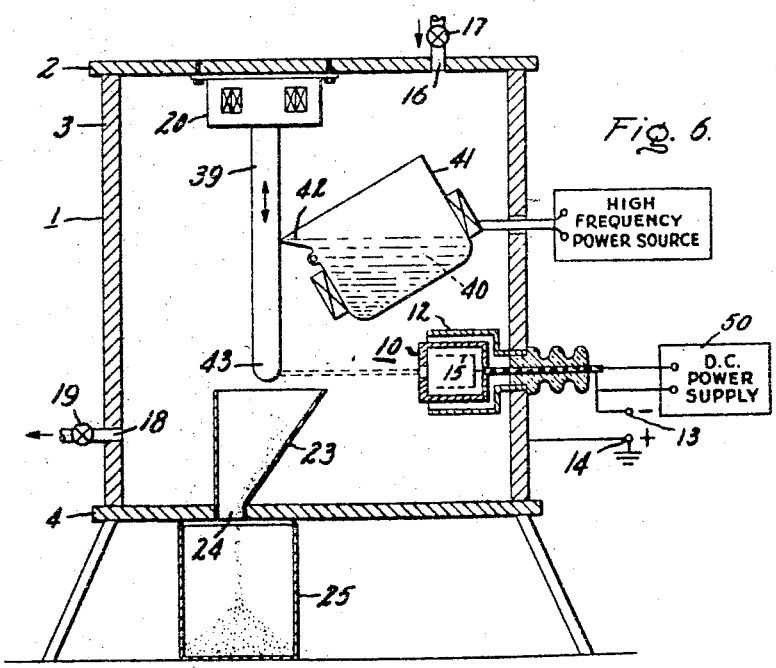
FIGURE 6 is a fifth embodiment of my apparatus wherein ultrasonic vibration is applied to a rod adjacent a container holding the molten state of the material to be processed.

The cathode operation is markedly improved by introducing a control or ring electrode 15 within the cathode cavity whereby the electron beam current can be smoothly varied over a considerable range. Control electrode 15 comprises an electrically conductive ring shaped structure having an aperture substantially aligned with cathode aperture 11. The control electrode as herein recited is defined as any structure disposed internal to cathode 10 which affects the operation of the cathode and may be electrically connected or electrically insulated therefrom as described in much greater detail in the above-mentioned copending United States application. Control electrode 15, when electrically insulated from cathode 10, may be connected to a source of voltage which provides a controllable low potential between the control electrode and cathode as illustrated in FIGURES 6 and 7. The cathode to control electrode potential is generally adjustable in a range from zero to 300 volts and provides a means for controlling the electron beam current over a wide range.

A suitable gas, such as for example, argon, helium, hydrogen, or mixtures of selected gases, is introduced into the interior of housing 1 through passage means 16 which may pass through any wall of housing 1 and for illustrative purposes is shown as passing through top end plate 2. The particular gas employed is determined by the material forming rod 6 and the desired composition of the particles to be obtained by my process. In particular, a reducing atmosphere of hydrogen is employed to reduce oxides and thereby obtain relatively noncontaminated particles. If the material 6 is originally in pure form, helium or argon are preferably employed to obtain noncontaminated particles. Passage means 16 is connected to a gas supply (not shown) through throttle valve 17 which regulates the rate of gas flow into housing 1. A second passage means 18 is located in a wall of housing 1 preferably remote from passage means 16 and is illustrated as passing through side wall 3. Passage 18 normally has a larger cross section than passage 16 and thus provides a low impedance exit for any objectionable gas which may be generated by the beam irradiated workpiece, rod 6. An exhaust pumping device (not shown) is connected to passage 18 through regulating valve 19 and aids in maintaining a desired gas pressure within housing 1. Thus, possible contamination of cathode 10 by undesired gases generated by the irradiated material 6 is largely prevented with the exhaust system.

Electron beam generation is initiated by providing the cathode with a particular negative voltage from the power supply and subsequently introducing the gaseous medium to the interior of housing 1 and increasing this gas pressure to a selected low pressure level. Alternatively, the gas may be first introduced and the desired voltage thence provided. At a particular gas pressure and cathode voltage the interior of the cathode cavity comprises a glowing body of plasma or ionized gas generated by the interaction of the low pressure gaseous medium and high negative potential of the cathode with respect to the anode. The potential distribution inside the cathode allows emergence of a stream of electrons from the plasma and this initiates the beam formation. A typical pressure range for beam mode operation in an argon medium and a cathode voltage of 20 kilovolts is 5–12 microns. Electron beam cross sections less than 1/8 inch diameter are readily obtained from my cathode device. Beam cross sections of less than 0.001 square inch may be obtained by supplementing the self-focusing feature of the cathode device with conventional beam focusing techniques such as electrostatic and electromagnetic means. A significant advantage in employing an electron beam device in my process of making particles, and in particular, the hollow cathode plasma source, is the high energy density obtainable therefrom which thereby provides the desired surface heating of rod 6, and resultant thin film of molten material. Further, the hollow cathode plasma source can be accurately controlled over a wide range of beam intensity thereby providing an accurate control of the temperature of the molten film which in turn controls the particle size.

A conventional ultrasonic transducer 20 such as illustrated in "Ultrasonic Technology," author Richard Goldman, publisher Reinhold Publishing Corporation, comprises a magnetostrictive driver which is actuated by a driver coil suitably energized from a source of alternating current electrical energy having a frequency of approximately 20 kilocycles per second and a bias coil energized from a direct current source. A concentrator horn 21 is connected to the transducer head and the upper surface 22 thereof is adapted to collect the molten droplets which fall from the electron beam irradiated molten surface at the central portion of end 7 of the rod material 6 being processed. The concentrator horn vibrates in a direction normal to surface 22 and the amplitude of vibration of surface 22 and the frequency of such vibration are controlled by controlling the magnitude and frequency of the alternating current power supplied to the driver coil of transducer 20. Surface 22 must be located at an antinode of the vibrating system. The amplitude of surface 22 vibration must be at least several diameters of the particles to be formed. A typical application comprises an amplitude of vibration or total displacement of 0.003 inch and a frequency of 20 kilocycles per second. Uniformly small spherical particles are formed by the ultrasonic vibration or agitation of a molten surface or film of the material of rod 6 in wetting contact on surface 22. The particles are emitted or ejected in somewhat of a fine spray form and such particles drop into a suitable collecting means 23. Collecting means 23 may be periodically removed from housing 1 and the particles thereby removed; however, my preferred embodiment includes a trough-like member 23 being angularly disposed and terminating at its lowest point in a funnel-like member 24 whereby the particles are conveyed into a suitable container means 25 which is sealed to housing 1 and adapted to be removed therefrom as desired. A suitable cooling means may be provided in container 25 to prevent coalescence of the particles. The cooling means may be external or internal of container 25. A suitable anti-coalescence agent for use internal of container 25 is a silicone oil.

The process by which uniformly small spherical particles of controlled size are produced from the apparatus illustrated in FIGURE 1 comprises the following steps. The rod 6 of material to be processed is positioned within housing 1 such that unsupported end 7 is aligned with aperture 11 of the cathode device. Sufficient electrical energy is thence applied to the cathode 10 to maintain the cathode at a selected negative potential relative to the anode. A particular gas, determined by the material being processed and the desired particle end product, is then introduced into housing 1 to produce a desired low pressure atmosphere therein by controlling gas valves 17 and 19. Alternatively, the desired gaseous medium may first be obtained and electrical energy subsequently applied. The interaction of the gaseous medium and the negative cathode-to-anode potential generates an electron beam which irradiates a small region of the lower end 7 (as illustrated in FIGURE 1) of rod 6. The intensity and focus of the electron beam is adjusted to obtain sufficient electron beam irradiation to attain and maintain only surface melting of the lower end 7 of rod 6. Rod 6 is moved or fed longitudinally (vertically downward for the vertical orientation of rod 6 in FIGURE 1) at a speed sufficient to replace the material removed from vibrating surface 22 by the ultrasonic energy, that is, to maintain a particular depth of the material on surface 22 of from one to several particle diameters, and to prevent excessive buildup of the molten material on surface 22. It should be apparent that the control of the electron beam and rod feed are not independent of each other and thus must be coordinated for maximum production of a selected size of particles.

In the production of particles from material having a relatively low melting point, herein defined as below 1600° C., concentrator horn 21 may be constructed from a high temperature ceramic material. In high melting point temperature applications, collector horn conveniently comprises a stainless steel lower section 26 and a ceramic upper section 27 as illustrated in the FIGURE 2 embodiment. It is noteworthy to comment that the temperature gradient at collector horn 21 must be sufficiently large to maintain the melting point temperature at the top surface of the material deposited on the top of vibrating surface 22 without exceeding the softening point temperature of the material of the concentrator horn and the Curie point of the magnetostrictive driver of the transducer. Since the heat conductivity for ceramic material is low compared to that of steel, the use of the concentrator horn divided into a ceramic and steel section permits more effective control of the temperature gradient within the concentrator horn whereby the aforementioned conditions are satisfied. A ceramic concentrator horn having no steel portion may also be employed in high temperature applications by forming a relatively thick solidified layer on surface 22 from the molten material of rod 6. As ceramic surface 22 becomes heated from the solidified material thereon, the outer surface of the solidified material becomes molten. Further droplets of molten material from end 7 of rod 6 thereupon remain in their molten state at the liquid surface of the thick layer of material deposited on surface 22 and the ultrasonic energy is thence transmitted up through the ceramic body 21 to the liquid interface of the material deposited on surface 22. The temperature gradient may thus be maintained sufficiently high through the layer of solidified material on surface 22 whereby the ceramic horn is not destroyed. The ceramic, in turn, maintains a sufficient temperature gradient to protect the ultrasonic magnetostrictive driver by maintaining it below its Curie temperature. Thus, it may be seen that materials having a high or low melting point temperature may be processed for producing uniformly small particles therefrom by depositing a thin film of the molten material in wetting contact on an ultrasonically vibrating surface. The film of molten material is necessary for the proper absorption of the ultrasonic energy and should be thicker than the desired particle diameter. A mere dropping of individual droplets of the molten material on an empty (nonwetted by a thin film of the molten material) vibrating surface will not produce the desired uniformly small particles since such droplets will merely bounce off the vibrating surface rather than absorbing the ultrasonic energy for conversion into particle form.

FIGURE 2 illustrates a second embodiment of my apparatus and illustrates a thermionic emission-type cathode as distinguished from the nonthermionic cathode illustrated in FIGURE 1. Both types of cathodes may be positioned at any angle within the housing. The electron beam device of FIGURE 2 comprises a filament heated cathode 28 and suitable beam-focusing means such as electromagnetic coil 29 electrically energized from a source of direct current power. The material 6 to be processed is shown oriented in a horizontal plane to emphasize the fact that such material need not be suspended vertically as illustrated in FIGURE 1. Since a thermionic emission-type cathode suffers contamination in the presence of many gases, the FIGURE 2 embodiment is particularly adapted for vacuum-type operation. The steps of the process for producing the uniformly small particles in the apparatus of FIGURE 1 are applicable in like manner to the apparatus of FIGURE 2.

FIGURE 3 illustrates a third embodiment of my apparatus for producing uniformly small spherical particles of controlled size from materials characterized by the property of existing in liquid state at pressures below atmospheric. The separate magnetostrictive-type transducer employed in FIGURES 1 and 2 is not employed in the embodiment of FIGURE 3. The ultrasonic vibration of rod 6 in FIGURE 3 is produced by subjecting such material to an ultrasonic frequency magnetic field created by coil 30 wound about a portion of rod 6 which is not heated above its Curie point temperature. The ultrasonic vibration is achieved by employing the magnetostrictive properties of a solid material 6 and thus the apparatus of FIGURE 3 is restricted to producing particles from materials having large magnetostrictive coefficients. The direct electron beam heating of end 7 of the material being processed renders the apparatus suitable for processing the highest and lowest melting point temperature materials as in the FIGURES 1 and 2 embodiments, however, the requirement for material 6 being sufficiently magnetostrictive limits such application to metals such as nickel alloys and other ferromagnetic materials.

The apparatus of FIGURE 3 is especially well adapted for applications wherein the cathode is operable in a first gaseous medium and the material 6 being processed is in the second gaseous medium. A partitioning member 31 is employed to separate the cathode chamber 32 from the workpiece chamber 33. A gas inlet 34 and gas outlet 35 are provided in the walls of workpiece chamber 33 to introduce and control the pressure of the second gaseous medium. Workpiece chamber 33 may therefore contain the gaseous medium contained within cathode chamber 2 but at a different pressure or, may contain a different gaseous medium. An example of such application is the production of particles of nitrided steel. Ring electrode 15 and the cathode end wall of FIGURE 1 are replaced by a double bottom cathode in FIGURE 3, the inner bottom serving the function of ring electrode 15.

The process for producing the desired particles with the apparatus illustrated in FIGURE 3 basically comprises the same steps employed in the process employing the apparatus of FIGURES 1 and 2. The requirement for applying the ultrasonic frequency magnetic field to a portion of the magnetostrictive material 6 maintained below its Curie point temperature adds a restriction to the spacing between rod end 7 and the portion of the rod subjected to the magnetic field. Thus, rod 6 must be fed into the electron beam irradiation zone at a speed sufficient to replace the material removed by the ultrasonic energy, and maintain such surface at a fixed location which must be at an antinode of the vibrating system. The electron beam energy must be provided sufficiently to maintain the surface melted to a depth of one or more particle diameters.

FIGURE 4 illustrates a fourth embodiment of the apparatus according to my invention. In this fourth embodiment, ultrasonic energy is introduced into the molten surface at end 7 of rod 6 by inducing a high frequency electrical current into rod 6 in the presence of a strong direct current magnetic field. A high frequency source having a frequency preferably higher than 20 kilocycles per second is operatively coupled to the top end 8 of rod 6 by means of capacitor 36. A strong direct current magnetic field is supplied by an electromagnet comprising a laminated core 37 and a high current coil 38 wound thereon and illustrated more clearly in FIGURE 5. The ends of coil 38 are connected to a suitable source of direct current power. The double bottom cathode structure 10 of FIGURE 3 is modified in FIGURE 4 to a single bottom structure which is considerably thicker than either of the double bottoms. The material 6 which may be processed by the apparatus illustrated in FIGURE 4 may be of either high or low melting point temperature material but since a high frequency electrical current must be induced therein, it is necessarily limited to electrically conductive materials. Under the influence of the induced high frequency current and strong direct current magnetic field, the liquid state of the material becomes what may be described as pseudo-magnetostrictive to thereby produce the particles.

FIGURE 6 illustrates a fifth embodiment of an apparatus constructed in accordance with my invention. In this fifth embodiment, a rod 39 having a high melting point is connected to the transducer head or, alternatively, connected to the outer end of the concentrator horn of the transducer, and such rod thus vibrates at the ultrasonic frequency of the transducer vibration. The material 40 to be processed into the uniformly small spherical particles of controlled size is heated to a molten state within a crucible 41 comprised of a material that is nonreactive with the molten material therein and has a melting point temperature considerably higher than that of material 40. Material 40 may be heated to its molten state by any of a number of conventional means such as high frequency heating, as illustrated, induction heating and arc furnace heating. Crucible 41 is pivoted about its lip portion 42 to permit a controlled flow of molten material 40 downward along the side of vibrating rod 39. Rod 39 should be preheated by the electron beam or other suitable means and thus functions to guide the molten material to the lower end 43 thereof at which point the electron beam irradiates the surface of the molten material 40 formed thereon and the simultaneous heating of the material to a desired temperature and ultrasonic vibration of such surface produces the desired particles which drop into trough-like member 23. The electron beam is employed to accurately control the temperature of the molten surface and thereby further control the particle size obtained. The apparatus of FIGURES 6 and 7 to be hereinafter described are primarily applicable for processing the lower melting point temperature materials since the molten state thereof is obtained prior to irradiation by the electron beam. It can be appreciated that the apparatus of FIGURES 6 and 7 may also be utilized for producing particles from material having relatively high melting point temperatures but below that of the material forming crucible 41, however, the heating costs involved in maintaining such high melting point temperature material in a molten state within the crucible renders such application economically prohibitive. In the FIGURE 6 embodiment, cathode 10 employs a particular screen-type control electrode 15 connected to a controllable direct current bias voltage source 50 to provide an adjustable control electrode-to-cathode potential. Ultrasonic transducer 20 is within housing 1 in this particular embodiment merely to indicate it can be disposed inside or outside the housing. A cooling means (not shown) is required for the internally disposed transducer.

FIGURE 7 is a sixth embodiment of my apparatus and a modified version of the apparatus illustrated in FIGURE 6 in that the lip portion 42 of crucible 41 is vibrated at the ultrasonic rate and the electron beam is directed at the molten material 40 located at such lip portion. Crucible 41 is pivoted about the lip portion 42 sufficiently to maintain a molten surface of material 40 within such lip portion. Lip 42 is vibrated by member 43 connected to the transducer head. The simultaneous electron beam irradiation and ultrasonic vibration of the molten surface in lip portion 42 provides the necessary conditions for producing the uniformly small particles of controlled size from material 40. The electron beam is employed to accurately control the temperature of the molten surface in the lip portion and thereby further control the particle size obtained.

The rate of production of the small particles is determined by the volume displacement of the surface being vibrated ultrasonically. Thus, the volume rate (R) of production may be expressed as $$R = X \times f / \text{unit area/sec.} \qquad (1)$$

wherein $X$ = displacement of vibrating surface
$f$ = ultrasonic frequency

For a particular example wherein the total displacement of vibrating surface 22 in FIGURES 1 and 2 is 0.003 inch and the ultrasonic frequency is 20 kilocycles per second, the rate of production of the small particles is $$R = 0.003 \times 2.54 \times \frac{2 \times 10^4}{2} \text{ cc./cm.}^2/\text{sec.}$$

or 75 cc./cm.²/sec.
or 2 tons/cm.²/hour (for soft solder)

The cross sectional area of rod 6 of the material being processed is not limited by the area of the vibrating surface 22 on which the molten material is deposited and thence vibrated to form the desired small particles. In practice, vibrating surface 22 may vary from ¼ to 3 inches in diameter. Since the molten material tends to drip from the center of rod 6, such rod may have a cross-sectional area which is larger or smaller than the vibrating surface dimension.

The size of a small particle produced by my process may be determined to a first approximation by the balance of forces of the escaping particle since a small volume (particle) of liquid being accelerated by the retracting surface cannot escape therefrom unless the force due to that acceleration exceeds the surface tension around the circumference of the escaping (potential) particle. The force balance may be stated as $$ma = \pi d \gamma \qquad (2)$$

where $m$ = mass of sphere of diameter $d$
$a$ = acceleration on the potential particle
$d$ = diameter of potential particle
$\gamma$ = surface tension in dynes/cm. around the circumference of the escaping particle The mass of the potential particle is $$m = \frac{1}{6} \pi d^3 \rho \qquad (3)$$

where $\rho$ = density of the liquid

Thus, the diameter of the particle is $$d = \sqrt{6/a} \sqrt{\gamma/\rho} \qquad (4)$$

Assuming the acceleration "$a$" on the potential particle is surface acceleration due to simple harmonic motion, acceleration "$a$" becomes $$a = \frac{-4\pi X}{T^2} \qquad (5)$$

where $X$ = maximum displacement of vibrating surface in cm.
$T$ = period in seconds The acceleration constant "$a$" is seen to be a function of the ultrasonic transducer equipment. For a particular maximum displacement $X$ of the vibrating surface and frequency of vibration, the expression $$\sqrt{6/a}$$

is a constant. As an example, the transducer equipment constant for a 0.003 inch maximum displacement of vibrating surface 22 and an ultrasonic frequency of 20 kilocycles per second is $$\sqrt{6/a} = 5.65 \times 10^{-4}$$

The expression $$\sqrt{\frac{\gamma}{\rho}}$$

is a function of the material being processed into small particle form. Since $\gamma$ is a function of temperature, it is evident that control of the electron beam which determines the temperature of the molten material, may also be used to control particle size. As an example, solder has values for $\gamma$ and $\rho$ of 400 dynes/cm. and 9 gm./cc., respectively. Substituting these values in Equation 4 the diameter of the particle emitted from the vibrating molten surface of the parent material is $$d = 5.65 \times 10^{-4} \sqrt{\frac{400}{9}}$$

= 38 microns minimum size

This particle size is found to be similar for all the materials which may be processed by my apparatus for the particular equipment constant $\sqrt{6/a} = 5.65 \times 10^{-4}$. The particles formed by my process fall within a very small range of particle sizes since the probability of formation of a given diameter particle decreases as the fifth power of the diameter (the probability of formation being inversely proportional to the square of the number of molecules which in turn is proportional to the cube of the diameter). Thus, the diameter of the vast majority of the particles formed is the minimum diameter calculated from Equation 4.

It is readily observed by reference to Equations 1 and 4 that the production rate can be increased and the minimum particle size decreased by increasing the acceleration of the transducer head, that is, increasing the maximum displacement of the vibrating surface and the frequency of the ultrasonic vibration. Thus, it may be seen that the particle size as well as the production rate, may be controlled by controlling the operation of the ultrasonic transducer in the embodiments of FIGURES 1, 2, 6, 7 or the means for producing the ultrasonic agitation in FIGURES 3 and 4.

Finally, it is to be emphasized that my process is not limited to producing spherical particles. The spherical particles produced by ultrasonically agitating a molten film of the material may be deformed to nonspherical form without change in volume by impacting such spherical particles, while in a plastic state, on a suitable solid surface. Impacting such spherical particles, while in a molten state, on the solid surface will break up or subdivide such particles into uniform smaller spherical particles. Thus, the spacing of an impacting surface from the surface of production of the original spherical particles determines whether nonspherical or smaller spherical particles are finally formed. Alternatively, and preferably, a high velocity fluid jet (nonreacting gas or liquid) may be employed to produce the impacting effect on the originally formed spherical particles. The advantage of the fluid jet over the solid surface for producing the impact effect is the simultaneous cooling effect provided by the jet. The fluid jet 51 is illustrated in FIGURE 1 as being directed against the particles while in the molten state, thus effecting subdivision of the particles into smaller spherical particles. In FIGURE 2 the fluid jet 51 is directed against the particles while in the plastic state, thereby deforming the particles to nonspherical shape.

From the foregoing description, it can be appreciated that my invention makes available an improved process and apparatus for producing uniformly small spherical or nonspherical particles of controlled size from a solid materal characterized by the property of existing in liquid state at pressures below atmospheric. The improved process consists of heating the material by means of an electron beam sufficiently to produce a thin film of such molten material and simultaneously agitating such thin film with ultrasonic energy whereby uniformly small spherical particles of such material are emitted from the surface of the film and thence can be conveniently collected. The size of the particles is controlled by controlling the acceleration of the agitated thin film. The electron beam is employed since it provides the particular high energy density required in my process of only surface heating the material and thereby attaining a thin molten film thereof. Since the electron beam may be accurately controlled, it can accurately control the temperature of the molten material and thus provide a further control of the particle size. Noncontaminated particles may be obtained by properly selecting the gaseous environment within which the particles are formed.

Having described six embodiments of an improved apparatus for producing the uniformly small particles and the processes associated therewith, it is believed obvious that modifications and variations of my invention are possible in the light of the above teachings. Thus, various configurations of the electron beam generating means may be employed to obtain the desired melting of the material being processed. Further, the electron beam generator, and in particular, the nonthermionic hollow cathode, may be operated in the same gaseous environment in which the material is being processed or, alternatively, different gaseous mediums may be employed. The solid material to be processed may be directly vibrated, at ultrasonic frequencies and simultaneously heated by the electron beam to produce the desired particles, or the material to be processed may be deposited in liquid form on a separate ultrasonically agitated surface. It is, therefore, to be understood that changes may be made in the particular embodiments as described which are within the full intended scope of the invention as defined by the following claims.

What I claim as new and desire to secure by Letters Patent of the United States is:

1. A process for producing uniformly small spherical particles of controlled size in the range of 10 to 100 microns diameter comprising the steps of
   directing an electron beam at a body of material contained within a housing wherein the material is characterized by the property of existing in liquid state at pressures below atmospheric,
   heating a selected portion of the material to a desired temperature by subjecting that portion to sufficient electron beam irradiation to produce a thin molten surface thereon of one to several particle diameters of the material, and
   agitating the thin molten surface of the material at ultrasonic frequency and a controlled amplitude of vibration of magnitude greater than several particle diameters whereby uniformly small spherical particles of controlled size in the range of 10 to 100 microns diameter are emitted therefrom having a size being determined only by the acceleration of the agitated molten surface of material and surface tension and density characteristics of the particular material being processed.

2. A process for producing uniformly small spherical particles of controlled size in the range of 10 to 100 microns diameter comprising the steps of
   directing an electron beam at a selected portion of a body of material contained within a housing wherein the material is characterized by the property of existing in liquid state at pressures below atmospheric,
   melting the selected portion of the material by providing sufficient electron beam irradiation to produce a thin molten surface thereon, and
   agitating the body of material at ultrasonic frequency and a controlled amplitude of vibration whereby the thin molten surface is ultrasonically agitated and uniformly small spherical particles of controlled size in the range of 10 to 100 microns diameter are emitted therefrom having a size determined only by the acceleration of the body of material and surface tension and density characteristics of the particular material being processed.

3. A process for producing uniformly small spherical particles of controlled size in the range of 10 to 100 microns diameter comprising the steps of
   directing an electron beam at a selected portion of a body of solid material contained within a housing, wherein the material is characterized by the property of existing in liquid state at pressures below atmospheric,
   melting the selected portion of the material by providing sufficient electron beam irradiation to produce the liquid state thereof which drops from the body of material,
   forming a thin film of one to several particle diameters of the molten material on a surface positioned below the selected portion of the material being melted and in wetting contact therewith, and
   agitating the surface at ultrasonic frequency whereby uniformly small spherical particles of controlled size in the range of 10 to 100 microns diameter are emitted from the thin film having a size determined only by the acceleration of the agitated surface and surface tension and density characteristics of the particular material being processed.

4. A process for producing uniformly small spherical particles of controlled size in the range of 10 to 100 microns diameter comprising the steps of
   directing an electron beam at a first end of a body of solid material contained within a housing, wherein the material is characterized by the property of existing in liquid state at pressures below atmospheric,
   melting a thin layer of the surface of the first end of the body of solid material to a depth of one to several particle diameters of the material by subjecting the first end thereof to sufficient electron beam irradiation,
   moving the body of material longitudinally at a speed sufficient to replace the molten material removed therefrom by the acceleration of the moving molten material, and
   agitating the molten state of the material at ultrasonic frequency and a controlled amplitude of vibration of magnitude greater than several particle diameters whereby uniformly small spherical particles of controlled size in the range of 10 to 100 microns diameter are emitted from the molten material having a size determined only by the acceleration of the agitated molten material and surface tension and density characteristics of the particular material being processed.

5. A process for producing uniformly small spherical particles of controlled size in the range of 10 to 100 microns diameter comprising the steps of
   positioning a first end of a body of solid material characterized by the property of existing in liquid state at pressures below atmospheric, in a housing,
   directing an electron beam at the first end of the body of solid material,
   melting the surface of the first end of the body of material by subjecting the first end thereof to sufficient electron beam irradiation,
   agitating the molten state of the material at ultrasonic frequency and a controlled amplitude of vibration of magnitude greater than several particle diameters whereby uniformly small spherical particles of controlled size in the range of 10 to 100 microns diameter are emitted therefrom having a size determined only by the acceleration of the agitated molten state and surface tension and density characteristics of the particular material being processed, and controlling the atmosphere within the housing to produce the small particles in noncontaminated form.

6. A process for producing uniformly small spherical particles of controlled size in the range of 10 to 100 microns diameter comprising the steps of positioning a first end of a body of solid material characterized by the property of existing in liquid state at pressures below atmospheric, in alignment with an aperture of a hollow cathode wherein the cathode and first end of the solid material are contained within a housing, applying electrical energy to the cathode sufficient to maintain the cathode at a selected negative potential relative to the housing, controlling the rate of flow of a particular gas into the housing to produce a desired atmosphere therein and thereby produce a plasma within the cathode and an electron beam which issues therefrom and irradiates the first end of the solid material, melting the surface of the first end of the body of material by subjecting the first end thereof to sufficient electron beam irradiation, forming a thin film of one to several particle diameters of the molten material in wetting contact on a surface spaced below the first end of the solid material, and agitating the surface at ultrasonic frequency and a controlled amplitude of vibration of magnitude greater than several particle diameters whereby uniformly small spherical particles of controlled size in the range of 10 to 100 microns diameter are emitted from the film of molten material having a size determined only by the acceleration of the agitated thin film of molten material and surface tension and density characteristics of the particular material being processed.

7. A process for producing uniformly small spherical particles of controlled size in the range of 10 to 100 microns diameter comprising the steps of directing a controlled electron beam at a first end of a body of magnetostrictive solid material characterized by the property of existing in liquid state at pressures below atmospheric, wherein the first end of the material is contained within a housing, melting the surface of the first end of the body of material to a depth of one to several particle diameters by subjecting the first end thereof to sufficient electron beam irradiation, and applying an ultrasonic frequency magnetic field to a portion of the body material spaced from the first end thereof whereby the body vibrates in a longitudinal direction at a controlled amplitude of vibration to produce emission of uniformly small spherical particles of controlled size in the range of 10 to 100 microns diameter from the molten surface of the body of magnetostrictive material wherein the size is determined only by the acceleration of the vibrated molten surface and surface tension and density characteristics of the particular material being processed.

8. A process for producing uniformly small spherical particles of controlled size in the range of 10 to 100 microns diameter comprising the steps of directing an electron beam at a first end of a body of electrically conductive solid material characterized by the property of existing in liquid state at pressures below atmospheric, wherein the first end of the material is contained within a housing, melting the surface of the first end of the body of material by subjecting the first end thereof to sufficient electron beam irradiation, applying a relatively strong direct current magnetic field to the first end of the body of material, and inducing a high frequency electrical current into the body of solid material whereby the coaction of the induced high frequency current and direct current magnetic field generates ultrasonic vibration in the molten surface of the material and thereby produces emission of uniformly small spherical particles of controlled size therefrom in the range of 10 to 100 microns diameter having a size determined only by the acceleration of the vibrated molten surface of material and surface tension and density characteristics of the particular electrically conductive material being processed.

9. A process for producing uniformly small spherical particles of controlled size in the range of 10 to 100 microns diameter comprising the steps of melting a body of material in a fluid-container wherein the material is characterized by the property of existing in liquid state at pressures below atmospheric, positioning a relatively long body of solid material having a melting point higher than the melting point of the material within the container in a generally vertical configuration adjacent the fluid-container, preheating the relatively long body of solid material, tilting the fluid-container sufficiently to cause the melted material therein to flow upon the relatively long body of solid material at a particular flow rate, directing a controlled electron beam at the bottom end of the relatively long body of solid material whereby the molten material flowing downward along the surface of the relatively long body of solid material becomes heated to a particular temperature, and vibrating the relatively long body of solid material in a longitudinal direction at ultrasonic frequency and a controlled amplitude of vibration whereby uniformly small spherical particles of controlled size in the range of 10 to 100 microns diameter are emitted from a thin film of the molten material formed at the lower end of the relatively long body of solid material wherein the size is determined only by the acceleration of the vibrated thin film of molten material and surface tension and density characteristics of the particular material being processed.

10. A process for producing uniformly small spherical particles of controlled size in the range of 10 to 100 microns diameter comprising the steps of melting a body of material in a tiltable fluid-container having a lip portion wherein the material is characterized by the property of existing in liquid state at pressures below atmospheric, tilting the fluid-container sufficiently to cause the molten material within the container to flow into the lip portion at a particular flow rate, directing a controlled electron beam at the lip portion of the fluid-container whereby the molten material is heated to a particular temperature, and vibrating the lip portion of the fluid-container at ultrasonic frequency and a controlled amplitude of vibration whereby uniformly small spherical particles of controlled size in the range of 10 to 100 microns diameter are emitted from the molten material having a size determined only by the acceleration of the vibrated molten material and surface tension and density characteristics of the particular material being processed.

11. The process set forth in claim 1 and further comprising the step of impacting the emitted spherical particles while existing in a plastic state whereby the particles are deformed to nonspherical shape.

12. The process set forth in claim 1 and further comprising the step of impacting the emitted spherical particles while existing in a molten state whereby the particles become subdivided into uniformly smaller particles.

13. Apparatus for producing uniformly small spherical particles of controlled size in the range of 10 to 100 microns diameter comprising
- a housing containing a particular gaseous atmosphere therein,
- means for generating a controlled electron beam for heating the surface of a material contained within the housing to a selected temperature in the molten state wherein the material is characterized by the property of existing in liquid state at pressures below atmospheric, and
- means for agitating the molten surface of the material at ultrasonic frequency and a controlled amplitude of vibration of magnitude greater than several particle diameters whereby uniformly small spherical particles of controlled size in the range of 10 to 100 microns diameter are emitted therefrom having a size determined only by the acceleration of the agitated molten surface and surface tension and density characteristics of the particular material being processed, the molten surface being located at an antinode of the vibrating system formed by said agitating means.

14. The apparatus set forth in claim 13 and further comprising
- means for impacting the spherical particles while existing in a plastic state whereby the particles are deformed to nonspherical shape.

15. The apparatus set forth in claim 13 and further comprising
- means for impacting the spherical particles while existing in a molten state whereby the particles become subdivided into uniformly smaller spherical particles.

16. Apparatus for producing uniformly small spherical particles of controlled size in the range of 10 to 100 microns diameter comprising
- a housing containing a particular gaseous atmosphere therein,
- nonthermionic means for generating a controlled electron beam for heating the surface of a selected portion of a body of solid material contained within the housing to a selected temperature in the molten state wherein the material is characterized by the property of existing in liquid state at pressures below atmospheric, and
- an ultrasonic transducer having a vibrating surface located at an antinode of the vibrating system formed by said transducer and spaced below the selected portion of the body of material whereby a thin film of the molten material is formed thereon and agitated at an ultrasonic frequency to produce uniformly small spherical particles of controlled size in the range of 10 to 100 microns diameter having a size determined only by the acceleration of the agitated thin film of molten material and surface tension and density characteristics of the particular material being processed.

17. Apparatus for producing uniformly small spherical particles of controlled size in the range of 10 to 100 microns diameter comprising
- a housing containing a particular gaseous atmosphere therein,
- means for generating a controlled electron beam for heating the surface of a first end of a body of magnetostrictive solid material contained within the housing to a selected temperature in the molten state wherein the material is characterized by the property of existing in liquid state at pressures below atmospheric, and
- means for applying an ultrasonic frequency magnetic field to a portion of the body of material spaced from the first end thereof and located at an antinode of the vibrating system formed by the body of magnetostrictive solid material and ultrasonic frequency magnetic field applying means whereby the body vibrates in a longitudinal direction to produce emission of uniformly small spherical particles of controlled size in the range of 10 to 100 microns diameter from the molten surface of the body of magnetostrictive material wherein the size is determined only by the acceleration of the vibrated molten surface of material and surface tension and density characteristics of the particular material being processed.

18. Apparatus for producing uniformly small spherical particles of controlled size in the range of 10 to 100 microns diameter comprising
- a housing containing a particular gaseous atmosphere therein,
- means for generating a controlled electron beam for heating the surface of a first end of a body of electrically conductive solid material contained within the housing to a selected temperature in the molten state wherein the material is characterized by the property of existing in liquid state at pressures below atmospheric,
- means for inducing a high frequency electrical current into the body of solid material, and
- means for applying a relatively strong direct current magnetic field to the first end of the body of material whereby the coaction of the induced high frequency current and direct current magnetic field generates ultrasonic vibration in the molten surface of the material to produce emission therefrom of uniformly small spherical particles of controlled size in the range of 10 to 100 microns diameter and having a size determined only by the acceleration of the vibrated molten surface of material and surface tension and density characteristics of the particular material being processed.

19. Apparatus for producing uniformly small spherical particles of controlled size in the range of 10 to 100 microns diameter comprising
- a housing containing a particular gaseous atmosphere therein,
- a tiltable fluid container within said housing for holding a material characterized by the property of existing in liquid state at pressures below atmospheric,
- means for melting the material within said container,
- a relatively long body of solid material positioned in a generally vertical configuration adjacent said container, said long body having a melting point higher than the melting point of the material within said container,
- means for generating a controlled electron beam for heating the molten material which flows to the bottom end of said long body to a particular temperature, and
- an ultrasonic transducer having a vibrating surface in communication with the top end of the long body whereby the long body is adapted to vibrate in a longitudinal direction at ultrasonic frequency to produce emission of uniformly small spherical particles of controlled size in the range of 10 to 100 microns diameter from the molten material at the bottom end thereof, the particle size being determined only by the acceleration of the vibrated molten material at the bottom end of the long body and surface tension and density characteristics of the particular material being processed.

20. Apparatus for producing uniformly small spherical particles of controlled size in the range of 10 to 100 microns diameter comprising
- a housing containing a particular gaseous atmosphere therein, a tiltable fluid container within said housing for holding a material characterized by the property of existing in liquid state at pressures below atmospheric, said container having a lip portion, means for melting the material within said container, means for generating a controlled electron beam for heating the molten material which flows into the lip portion to a particular temperature, and an ultrasonic transducer having a vibrating surface in communication with the lip portion of said container whereby the lip portion is adapted to vibrate at ultrasonic frequency to produce emission of uniformly small spherical particles of controlled size in the range of 10 to 100 microns diameter from the molten material within said lip portion, the particle size being determined only by the acceleration of the vibrated molten material within the lip portion and surface tension and density characteristics of the particular material being processed.

References Cited by the Examiner

UNITED STATES PATENTS

| | | | |
|---|---|---|---|
| 2,163,649 | 6/1939 | Weaver | 241—1 X |
| 2,398,455 | 4/1946 | Unger | 264—9 |
| 2,488,353 | 11/1949 | Unger | 264—9 |
| 2,889,580 | 6/1959 | Wald et al. | 241—1 X |
| 3,131,051 | 4/1964 | Hanks et al. | 13—31 X |
| 3,210,454 | 10/1965 | Morley | 219—121 X |
| 3,210,518 | 10/1965 | Morley et al. | 13—31 X |

RICHARD M. WOOD, *Primary Examiner.*

R. F. STAUBLY, *Assistant Examiner.*